United States Patent [19]

Yamada et al.

[11] 4,095,469
[45] Jun. 20, 1978

[54] TEMPERATURE MEASURING APPARATUS

[75] Inventors: Takeo Yamada, Yokohama; Katsujiro Watanabe, Tokyo; Seigo Ando; Akira Kameyama, both of Yokohama, all of Japan

[73] Assignee: Nippon Kokan Kabushiki Kaisha, Tokyo, Japan

[21] Appl. No.: 776,901

[22] Filed: Mar. 11, 1977

[30] Foreign Application Priority Data

Mar. 17, 1976 Japan .................. 51-28140

[51] Int. Cl.$^2$ .................. G01K 7/36; G01R 33/12
[52] U.S. Cl. .................. 73/362 R; 324/222; 324/225
[58] Field of Search .................. 73/362 R, 342; 324/40

[56] References Cited

U.S. PATENT DOCUMENTS

| 3,164,993 | 1/1965 | Schmidt | 73/362 R |
| 3,281,667 | 10/1966 | Dobbins et al. | 324/40 |
| 3,358,225 | 12/1967 | Peugeot | 324/40 |
| 3,936,734 | 2/1976 | Brandli et al. | 73/362 X |
| 3,995,211 | 11/1976 | Yamada et al. | 324/40 X |

Primary Examiner—Charles A. Ruehl
Attorney, Agent, or Firm—Haseltine, Lake & Waters

[57] ABSTRACT

An apparatus for measuring the temperature of a metallic body in a non-contact maner includes an electronic circuitry for measuring a change in the impedance of a detecting coil arranged oppposite to the metallic body. The electronic circuitry comprises an operational amplifier, a negative feedback circuit with adjustable feedback factor, a positive feedback circuit, an oscillator, a phase shifter circuit and a synchronous detection circuit. The change in the impedance of the detecting coil is caused by the effect of eddy current produced by the application of alternating field to the metallic body, and this impedance change is dependent on change in the temperature of the metallic body. By adjusting the negative feedback factor $\beta_N$ of the negative feedback circuit and the phase angle $\theta$ of the phase shifter circuit in the electronic circuitry, the relationship between the distance measured between the detecting coil and the metallic body and the measured output level, the temperature measuring sensitivity relative to the temperature of the metallic body and the temperature measuring sensitivity relative to the measuring distance can be determined as desired.

5 Claims, 24 Drawing Figures

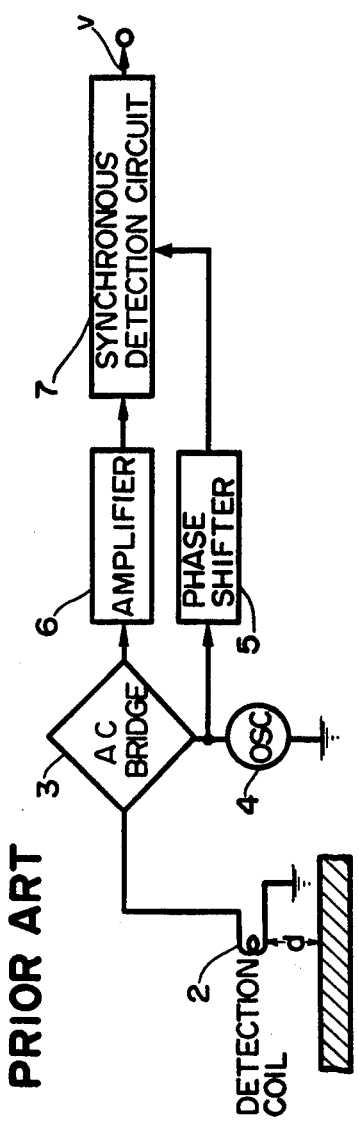
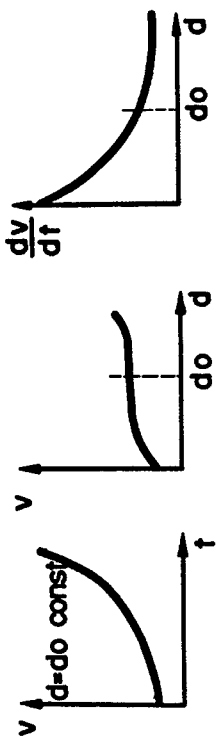

TEMPERATURE MEASURING APPARATUS

BACKGROUND OF THE INVENTION

This invention relates to temperature measuring apparatus, and more particularly it relates to an improved temperature measuring apparatus for measuring the temperature of an electric conductor in a non-contact manner by utilizing the effect of eddy current.

A means of measuring the temperature of a metallic body by utilizing the effect of eddy current is known in the art. This means has been considered as an effective means of temperature measurement on a rolling mill line and the like, since this means has certain advantages over other temperature measuring means known in the art, such as, possibility of accurately measuring temperatures around room temperature, faster response and capability of being used in unfavorable atmospheric conditions.

However, the eddy current type thermometers which have heretofore been developed are disadvantages in that variation in the distance between a metallic body to be measured and the detecting coil affects the measured output of the meter and also causes deterioration of the temperature measuring sensitivity or the response of the measured output to temperature changes, and so on. Illustrated in FIG. 1 is a prior art apparatus of this type comprising a detecting coil 2 connected to one arm of an AC bridge 3, an oscillator 4 connected to energize the AC bridge 3, an amplifier 6 connected to another arm of the AC bridge 3, and a synchronous detection circuit 7 including a phase shifter 5 for accomplishing synchronous detection to produce a measured temperature output $v$. The temperature measuring characteristics of this known eddy current type thermometer may be represented by the graphs shown in FIGS. 2, 3 and 4. FIG. 2 shows the relationship between the temperature $t$ of the metallic body 1 to be measured (the measuring distance $d$ is constant), FIG. 3 shows the relationship between the measured output $v$ (the temperature $t$ is constant) and the measuring distance $d$ between the metallic body 1 and the detecting coil 2, and FIG. 4 shows the relationship between the measuring distance $d$ and the temperature measuring sensitivity $dv/dt$. As will be seen from these results, while the effect of the variation in the measuring distance on the measured output $v$ of this prior art apparatus can be ignored as shown in FIG. 3, the temperature measuring sensitivity $dv/dt$ is affected by the variation in the measuring distance $d$ as shown in FIG. 4, and hence the measured output $v$ is affected by the variation in the measuring distance.

Another type of measuring means is known in the art wherein, as shown in FIG. 5, a detecting coil 2 is connected to an oscillator 8 as the resonant element, whereby by utilizing inductance changes dependent on the temperature of the detecting coil 2, the temperature of a metallic body is counted and measured by a counter 9 in the form of a change in the oscillation frequency of the oscillator 8 in relation to the temperature as shown in FIG. 6. Also with this means, while the measuring distance $d_0$ which will not be affected directly by variation in the measuring distance as shown in FIG. 7 may be determined by properly selecting the size of detecting coil and the value of oscillation frequency, the temperature measuring sensitivity $df/dt$ to variation in the measuring distance is varied as shown in FIG. 8 and consequently the sensitivity is affected by variation of the measuring distance.

Thus, with the known thermometer utilizing the effect of eddy current, the temperature measuring sensitivity is invariably decreased exponentially with increase in the measuring distance $d$, thus giving rise to measurement errors. While still another type of measuring means has been proposed in which variation in the measuring distance is detected by a separate distance meter to automatically compensate the temperature measuring sensitivity, this type of apparatus has not been put into practical use due to the weakness of this measuring distance detection per se.

SUMMARY OF THE INVENTION

The present invention has been made to overcome the foregoing deficiencies of the above-mentioned temperature measuring means utilizing eddy current effect, and in an illustrative embodiment of the invention the temperature measuring apparatus is designed so that a change in the impedance of the detecting coil which is dependent on the temperature of a metallic body to be measured, is detected by a differential amplification type operational amplifier. The operational amplifier includes a positive feedback circuit having a feedback element consisting of a dummy coil and a negative feedback circuit with adjustable negative feedback factor. The detecting coil is connected to the positive input terminal of the operational amplifier, and connected to the negative input terminal of the operational amplifier is an oscillator for producing AC reference signal having a constant amplitude and constant frequency. The output of the operational amplifier is supplied to a synchronous detection circuit. The AC reference signal from the oscillator is supplied through a phase shifter to a synchronous detection circuit as a reference signal.

In this embodiment of the invention, the amplification degree is determined by the negative feedback factor, the impedance of the dummy coil and the impedance of the detecting coil.

Also in this embodiment of the invention, the measured signal output is determined by the amplification degree of the amplifier, the set phase angle of the phase shifter, and the phase difference between the AC reference signal from the oscillator and the output signal of the operational amplifier.

Also in this embodiment of the invention, the negative feedback factor of the negative feedback circuit and the set phase angle of the phase shifter may be adjusted to provide a desired temperature measuring characteristic.

In the apparatus according to another embodiment of this invention, the oscillator for producing constant-amplitude, constant-frequency AC reference signal is connected in parallel with the detecting coil.

Therefore, it is an object of this invention to provide an improved temperature measuring apparatus employing a feedback amplifier circuit and eddy current effect and capable of measuring the temperature of a metallic body in a non-contact manner.

It is another object of this invention to provide such improved temperature measuring apparatus having amplification parameters so that the amplification degree of the operational amplifier is varied with variation in the impedance of the detecting coil to thereby detect the temperature of a metallic body to be measured.

It is still another object of this invention to provide such improved temperature measuring apparatus wherein the measured temperature output characteristic may be adjusted arbitrarily by adjusting the reference phase used for synchronous detection of the output signal from the operational amplifier.

It is still another object of the invention to provide such improved temperature mesuring apparatus wherein variation in the temperature measuring sensitivity caused by variation in the distance between a metallic body to be measured and the detection coil is prevented by circuit means, the ensuring highly accurate measurements despite variation in the measuring distance.

The above and other objects, features and advantages of this invention will be readily apparent from considering the following detailed description taken in conjunction with the accompanying drawings.

BRIEF DESCRIPTION OF THE DRAWINGS

FIG. 1 is a block diagram showing a prior art eddy current type thermometer employing an AC bridge.

FIG. 2 is a graph showing the relationship between the temperature $t$ and the measured output $v$ in the prior art apparatus of FIG. 1.

FIG. 3 is a graph showing the relationship between the temperature measuring distance $d$ and the measured output $v$ in the prior art apparatus of FIG. 1.

FIG. 4 is a graph showing the relationship between the measuring distance $d$ and the temperature measuring sensitivity $dv/dt$ in the prior art apparatus of FIG. 1.

DESCRIPTION OF THE PREFERRED EMBODIMENT

Figure 9:
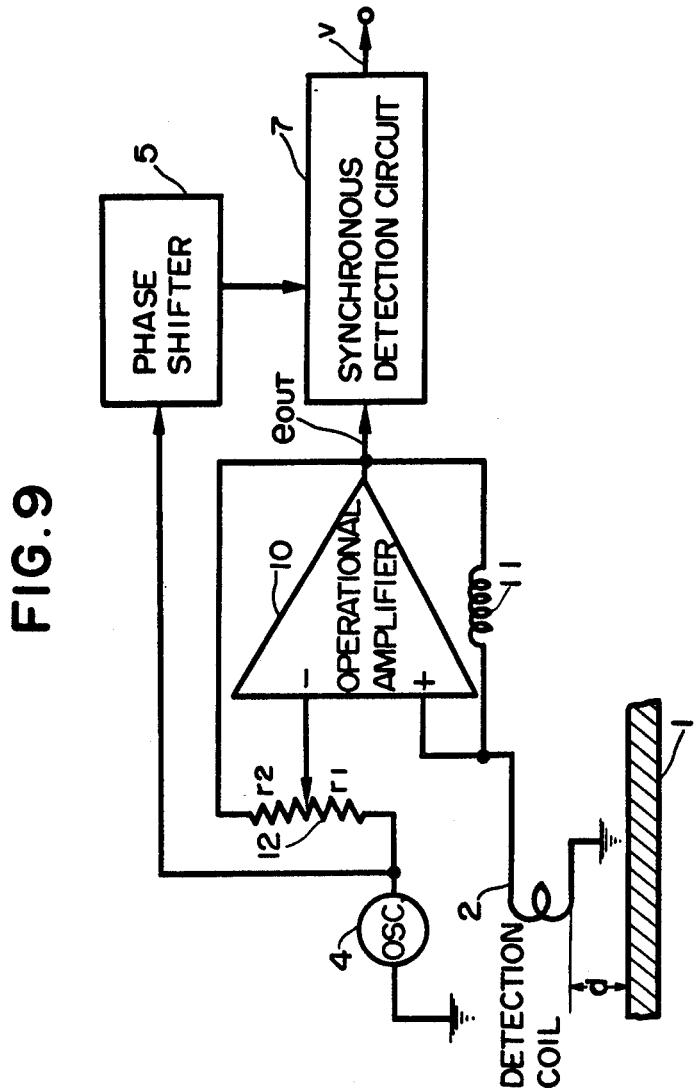
FIG. 9 is a block diagram showing an embodiment of a temperature measuring apparatus according to this invention.

Referring to FIG. 9 numeral 1 designates a metallic body to be measured, above which a detecting coil 2 is arranged with a distance $d$ therebetween. This measuring distance $d$ is randomly variable in accordance with the thickness of the metallic body 1 or in response to mechanical vibration, etc. Numeral 4 designates an oscillator for producing an oscillation output having a constant amplitude, phase and frequency, numeral 5 designates a phase shifter whereby the phase angle of the signal applied from the oscillator 4 is adjusted and applied as a synchronous detection referrence signal to a synchronous detection circuit 7. Numeral 10 designates a differential amplification type operational amplifier wherein its noninverting terminal (+) is connected to the detecting coil 2 and to its output terminal through a dummy coil 11 thereby forming a positive feedback circuit. Connected to the inverting input terminal (−) of the operational amplifier 10 is the sliding output terminal of a potentiometer 12 which is connected between the oscillator 4 and the output terminal of the operational amplifier 10, thus forming an input circuit for the output signal of the oscillator 4 and a negative feedback circuit for the operational amplifier 10.

The operation of the circuitry shown in FIG. 9 is as follows. When the measuring distance of the detecting coil 2 increases, the amplification degree increases thus providing a temperature measuring sensitivity compensating characteristic by the negative feedback factor, and at the same time the synchronous detection circuit 7 provides a measured temperature signal $v$ representating the temperature of the metallic body 1 which is not directly affected by the variation of the measuring distance.

More specifically, the impedance of the detecting coil 2 changes in accordance with the temperature $t$ of the metallic body 1 and the measuring distance $d$. Now assuming that $Z(t, d)$ represents the impedance of the detecting coil 2, $Z_1$ the impedance of the dummy coil 11, $(r_2/r_1)$ the resistance ratio of the potentiometer 12 or the negative feedback factor $\beta_N$ of the negative feedback circuit, G the open loop gain of the operational amplifier 10, $e_{in}$ the input voltage from the oscillator 4, and $e_{out}$ the output voltage of the operational amplifier 10, then the relationship between the input voltage $e_{in}$ and the output voltage $e_{out}$ or the amplification degree A is given as follows.

$$A = \frac{e_{out}}{e_{in}} = \frac{-\beta_N}{1 - \frac{Z(t, d)}{Z_1 + Z(t, d)} (1 + \beta_n)} \quad (1)$$

Thus it will be seen that the amplification degree A varies depending on the negative feedback factor $\beta_N$, the temprature $t$ and the measuring distance $d$.

Consequently, if $A = f(\beta_N, t, d, k)$, and the input voltage $e_{in}$ is constant, then we obtain $$e_{out} = f(\beta_N, t, d, k) \cdot e_{in} \quad (2)$$

where $k$ is a constant which is dependent on the dummy coil impedance $Z_1$.

Thus, the measured output $v$ obtained by synchronously detecting the output signal $e_{out}$ by the synchronous detection reference signal of the phase angle $\theta$ determined by the phase shifter 5 (the phase angle $\theta$ with respect to the input signal $e_{in}$) in the synchronous detection circuit 7, is given as follows $$v = |f(\beta_N, t, d, k)|e_{in} \cos(\phi - \theta) \qquad (3)$$

Thus, the measured output $v$ may be obtained as a function of $\beta_N$, $t$, $d$, $\theta$ and $\phi$. However, $\phi$ is the phase angle of the output voltage $e_{out}$ with respect to the input voltage $e_{in}$.

The present invention is featured in that the negative feedback $\beta_N$ and the phase angle $\theta$ in the above equation are so determined that variation in the measuring distance $d$ has no effect on the measured output $v$. This action will now be described in detail with reference to FIGS. 10a, 10b and 10c showing the experimental results obtained with an apparatus incorporating the circuitry shown in FIG. 9.

Figure 10A:
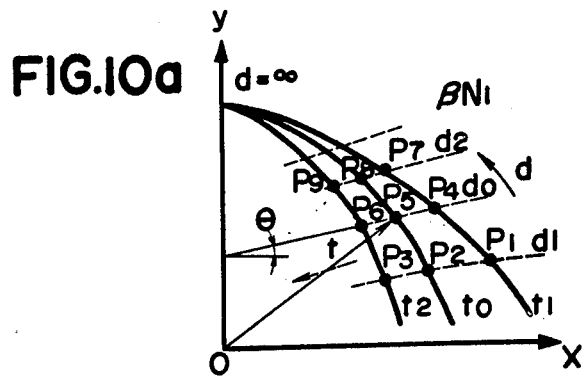
FIGS. 10a, 10b and 10c are graphs showing the vector loci of output voltage $e_{out}$ of the operational amplifier shown in FIG. 9, with the negative feedback factor held constant and the temperature $t$ and the measuring distance $d$ used as parameters.
Figure 10B:
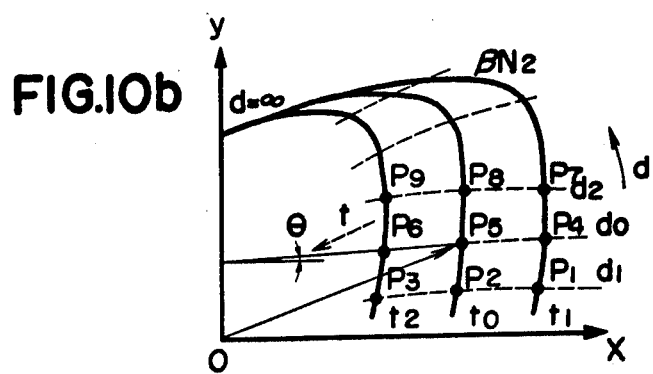
Figure 10C:
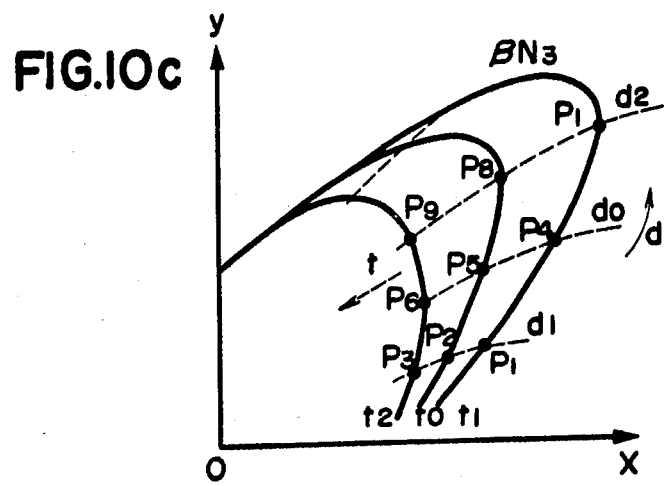

FIGS. 10a, 10b and 10c are graphs showing the loci of the vector $\overrightarrow{OPi}$ ($i = 1, 2, 3, \ldots, n$) of the output voltage $e_{out}$ obtained for $\beta_{N1}$, $\beta_{N2}$ and $\beta_{N3}$ of the negative feedback factor $\beta_N$ (where $\beta_{N1} < \beta_{N2} < \beta_{N3}$) with the temperature $t$ and the distance $d$ as parameters. In the Figures, the axis $x$ represents the voltage component which is in phase with the input voltage $e_{in}$, the axis $y$ represents the voltage component which is out of phase with the input voltage $e_{in}$ by 90°, the temperatures $t$ are $t_1 < t_0 < t_2$, and the measuring distances $d$ are $d_1 < d_0 < d_2$.

If, for example, the phase angle $\theta$ of the phase shifter 5 shown in FIG. 9 is set equal to the angle made by the straight line $P_4P_6$ with the axis $x$, in FIG. 10a the output vector $\overrightarrow{OP5}$ changes as follows.

(1) When the temperature changes from $t_0$ to $t_1$ or $t_2$, the change takes the form of a vector $\overrightarrow{P_5P_4}$ or $\overrightarrow{P_5P_6}$.
(2) When the measuring distance changes from $d_0$ to $d_1$ or $d_2$, the change takes the form of the projection component of a vector $\overrightarrow{P_5P_2}$ or $\overrightarrow{P_5P_8}$ to the straight line $P_4P_6$.

These relations apply to the cases of FIGS. 10b and 10c where the negative feedback factors $\beta_N$ are $\beta_{N2}$ and $\beta_{N3}$, respectively.

As will be seen from the graphs showing these experimental results, by adjusting the negative feedback factor $\beta_N$, it is possible to obtain, as desired, a characteristic which causes the trapezium $P_1P_3P_9P_7$ to take the form of a downwardly spreading trapezoid in FIG. 10a, substantially rectangular form in FIG. 10b and upwardly spreading trapezoid in FIG. 10c.

FIGS. 12a to 12c, FIGS. 11a to 11c and FIGS. 13a to 13c are graphs corresponding to FIGS. 10a to 10c and respectively showing the relationship between the measuring distance $d$ and the measured output $v$ (the Figures being designated as (a), the relationship between the temperature $t$ and the measured output $v$ (the Figures being designated as (b), and the relationship between the measuring distance $d$ and the temperature measuring sensitivity $dv/dt$ (the Figures being designated as (c). It will be seen that the optimum mode of operation for the temperature measuring apparatus according to this invention is to use the relationships shown in FIGS. 11b, 12b and 13b, namely, to adjust the negative feedback factor $\beta_N$ to $\beta_{N2}$ and adjust the phase angle $\theta$ to become equal to the angle formed by the straight line $P_4P_6$ with the axis $x$ as shown in FIG. 10b.

Assuming now that in FIG. 10b the vector representing the output voltage $e_{out}$ is the vector $\overrightarrow{OP5}$, if the measuring distance is held constant at $d_0$ and the temperature $t$ increases from $t_0$ to $t_1$, the measure output $v$ which is a $\cos \theta$ component of the output voltage $e_{out}$ decreases in linearly inverse proportion. Also in FIG. 10b, if the temperature $t$ is constant at $t_0$ and the measuring distance $d$ is changed from $d_0$ to $d_1$ or $d_2$, this results in $\overrightarrow{P_2P_3} \approx \overrightarrow{P_5P_6} \approx \overrightarrow{P_8P_9}$ or $\overrightarrow{P_2P_1} \approx \overrightarrow{P_4P_5} \approx \overrightarrow{P_8P_7}$, and consequently the measuring sensitivity $dv/dt$ remains practically constant and is not varied as shown in FIG. 13b even if the measuring distance $d$ is varied.

Figure 11A:
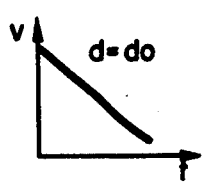
FIGS. 11a, 11b and 11c are graphs corresponding to FIGS. 10a, 10b and 10c, showing the relationship between the temperature $t$ and the measured output $v$ in the embodiment of FIG. 9.
Figure 12A:
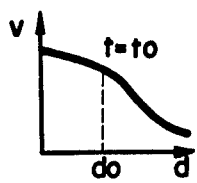
FIGS. 12a, 12b and 12c are graphs corresponding to FIGS. 10a, 10b and 10c, showing the relationship between the measuring distance $d$ and the measured output $v$ in the embodiment of FIG. 9.
Figure 13A:
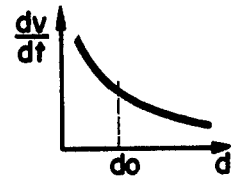
FIGS. 13a, 13b and 13c are graphs corresponding to FIGS. 10a, 10b and 10c, showing the relationship between the measuring distance $d$ and the temperature measuring sensitivity $dv/dt$ in the embodiment of FIG. 9.
Figure 11B:
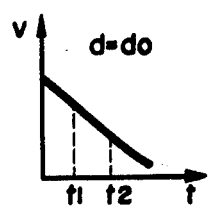
Figure 12B:
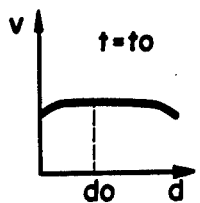
Figure 13B:
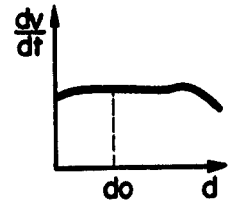
Figure 11C:
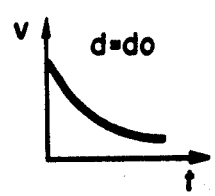
Figure 12C:
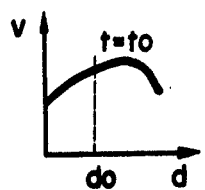
Figure 13C:
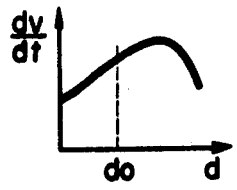

Further, if the negative feedback factor $\beta_N$ is adjusted to $\beta_{N1}$ in FIG. 10a, the resulting characteristics shown in FIGS. 11a, 12a and 13a are substantially equal to those obtained with the conventional means, and adjusting the negative feedback factor $\beta_N$ to $\beta_{N3}$ in FIG. 10c results in the characteristics shown in FIGS. 11c, 12c and 13c which are quite contrary to those obtained with the conventional means and particularly interesting is the characteristic showing that the temperature measuring sensitivity $dv/dt$ increases with increase in the measuring distance $d$ within a certain range as shown in FIG. 13c.

Figure 14:
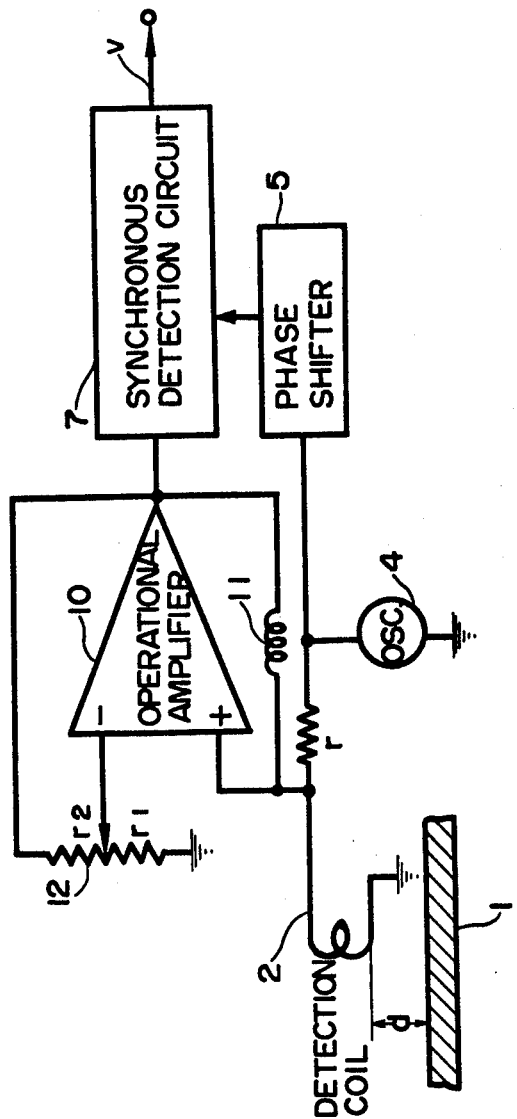
FIG. 14 is a block diagram showing still another embodiment of the temperature measuring apparatus of this invention.

While, in the circuitry shown in FIG. 9, the output of the oscillator 4 is applied to the negative feedback circuit, the abovementioned characteristics may also be obtained by connecting the oscillator 4 through a resistance $r$ in parallel with the positive feedback circuit of the operational amplifier 10 or the detecting coil 2 as in the case of another embodiment of the invention shown in FIG. 14.

Figure 5:
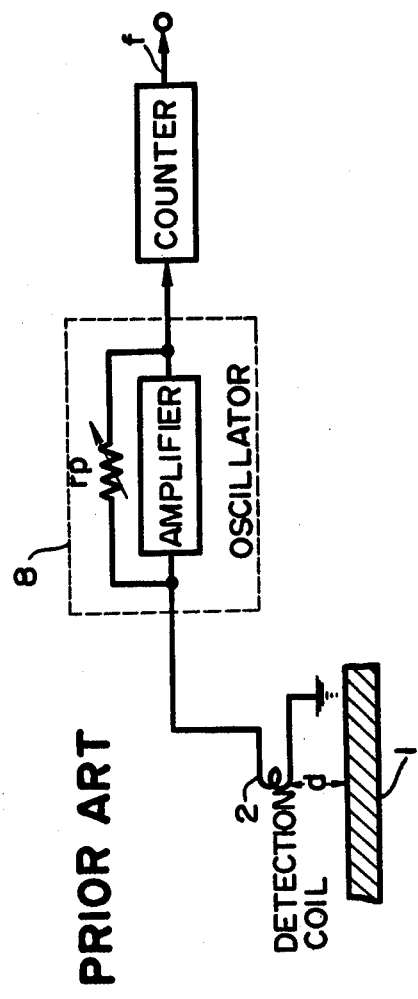
FIG. 5 is a block diagram showing another prior art eddy current type thermometer employing an oscillator circuit.
Figure 8:
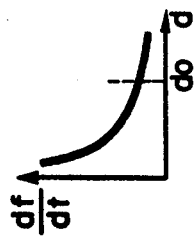
FIG. 8 is a graph showing the relationship between the measuring distance $d$ and the temperature measuring sensitivity $dv/dt$ in the prior art apparatus of FIG. 5.
Figure 7:
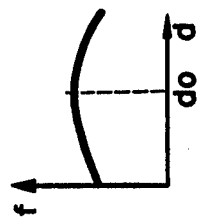
FIG. 7 is a graph showing the relationship between the measuring distance $d$ and the measured output $v$ in the prior art apparatus of FIG. 5.
Figure 6:
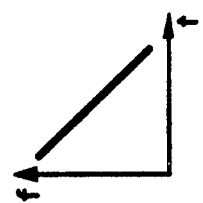
FIG. 6 is a graph showing the relationship between the temperature $t$ and the measured output $v$ in the prior art apparatus of FIG. 5.
Figure 15:
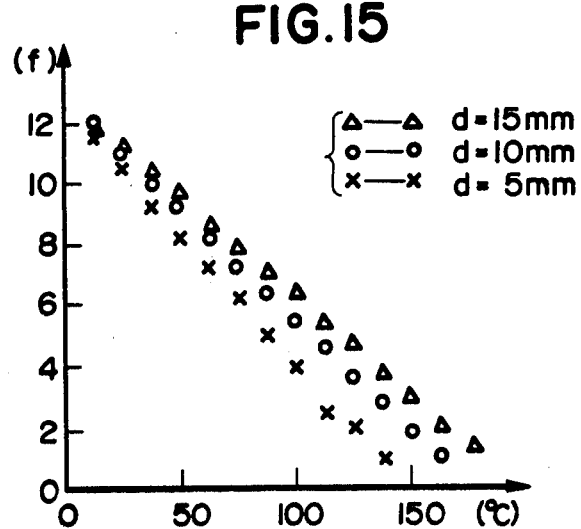
FIG. 15 is a graph showing the temperature measurement data of the prior art apparatus shown in FIG. 5.
Figure 16:
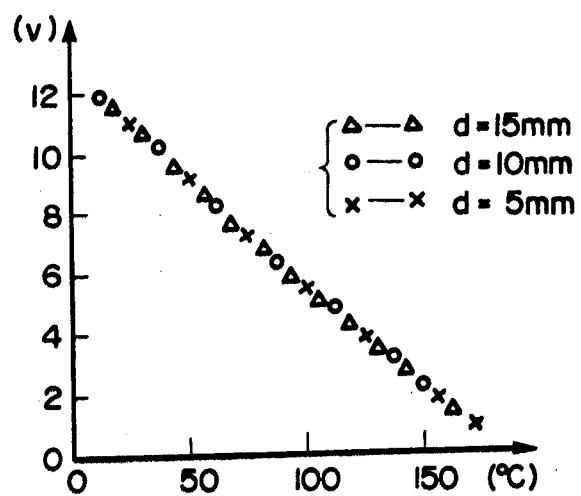
FIG. 16 is a graph showing the temperature measurement data of the temperature measuring apparatus according to this invention.

FIG. 15 is a graph showing the results of measurement by the conventional means shown in FIG. 5, and FIG. 16 is a graph showing the results of measurement by the apparatus of this invention. In both cases, the measurement data were obtained by using cold rolled sheet steel as the metallic body to be measured and measuring the temperature for different values of the measuring distance $d$. The data of FIG. 15, obtained with the conventional means in FIG. 5, shows that the value of measured temperature output $f$ for the same temperature $t$ varies for different values of the measuring distance $d$, whereas the data of FIG. 16, obtained with the temperature measuring apparatus of this invention, shows that the measured temperature output $v$ remains practically constant for different values of the measuring distance $d$. As will be seen from these experimental data, the apparatus of this invention is capable of accomplishing the measurement of temperature without being affected by variation in the measuring distance.

It will thus be seen from the foregoing that the temperature measuring apparatus of this invention and its oprational mode have realized a temperature measuring apparatus which employs only a single detecting coil, is not subject to the effect of variation in the measuring distance and utilizes the effect of eddy current, namely, a novel apparatus which has not been known in the art, and thus there is a great advantage that this invention can be used in all the applications in which the presently known eddy current type thermometers are in use.

Some examples of such applications include the non-contact measurement of the heat crown of metal rolling rolls having mechanical crown, temperature measurement on a rolling line or processing line for strip metal where the pass line is subject to variations, etc., and the invention is useful in a variety of applications.

We claim:

1. A temperature measuring apparatus for measuring temperature of a metallic body utilizing eddy current effect, comprising:

a differential amplification type operational amplifier having its one input terminal connected to a detecting coil and including a dummy coil to which positive feedback connection is made;

an oscillator connected to the other input terminal of said operational amplifier to supply thereto a signal having a constant amplitude and a predetermined oscillation frequency, the other input terminal of said operational amplifier being connected to provide a negative feedback circuit having an adjustable negative feedback factor;

a phase shifter connected to an output terminal of said oscillator for adjusting the phase angle of the signal from said oscillator to produce a synchronous detection reference signal; and a detection circuit connected to said operational amplifier and said phase shifter for synchronously detecting the output of said operational amplifier with the reference signal applied from said phase shifter to produce a signal indicative of a measured temperature.

2. An apparatus according to claim 1, wherein the operational amplifier has the following amplification degree $$A = \frac{-\beta_N}{1 - \frac{Z(t, d)}{Z_1 + Z(t, d)}(1 + \beta_N)}$$

where $\beta_N$ is the negative feedback factor, $Z_1$ is the impedance of the dummy coil, and $Z(t, d)$ is the impedance of the detecting coil determined by the temperature of the metallic body and the distance between the detecting coil and the metallic body.

3. An apparatus according to claim 1, wherein the measured temperature signal output $e_{out}$ of the apparatus is given as $$e_{out} = A \cdot e_{in} \cos(\phi - \theta)$$

where A is the amplification degree of the operational amplifier, $e_{in}$ is the input voltage from the oscillator, $\theta$ is the phase angle set by the phase shifter, and $\phi$ is the phase difference between the input voltage $e_{in}$ and the output voltage $e_{out}$.

4. An apparatus according to claim 1, wherein the negative feedback factor of the operational amplifier and the phase angle of the phase shifter are adjustable, whereby preventing a variation in the distance between the detecting coil and the metallic body from causing variation in the measured temperature signal level and the temperature measuring sensitivity of the apparatus.

5. An apparatus according to claim 1, wherein said negative feedback circuit including the oscillator for supplying a signal of a constant amplitude and predetermined oscillation frequency is connected in parallel with the positive feedback connection including said detecting coil.

* * * * *